United States Patent [19]

Feldmann

[11] Patent Number: 4,787,187
[45] Date of Patent: Nov. 29, 1988

[54] WINDOW TRIM STRIP

[75] Inventor: Franz Feldmann, Grolsheim, Fed. Rep. of Germany

[73] Assignee: General Motors Corporation, Detroit, Mich.

[21] Appl. No.: 89,729

[22] Filed: Aug. 26, 1987

[30] Foreign Application Priority Data

Aug. 28, 1986 [DE] Fed. Rep. of Germany ... 8623135[U]

[51] Int. Cl.4 .............................................. E04B 1/62
[52] U.S. Cl. ...................................... 52/397; 52/400; 52/208
[58] Field of Search ................ 52/397, 400, 716, 208; 296/93

[56] References Cited

U.S. PATENT DOCUMENTS 3,189,143 6/1965 Adams .............................. 296/93 X
4,523,783 6/1985 Yamada ............................ 52/208 X Primary Examiner—Carl D. Friedman
Attorney, Agent, or Firm—Charles E. Leahy

[57] ABSTRACT

A trim strip for covering the gap between a window glass and a window frame consists of a decorative strip covering the gap with a web projecting obliquely from the latter that can be inserted into the gap. The web has barb-like ribs pointing outwards and the lowest rib facing the window glass has two catch surfaces, provided at different heights, to engage behind the window glass.

2 Claims, 2 Drawing Sheets

WINDOW TRIM STRIP

The invention refers to a trim strip for covering the gap between a window glass and a window frame, consisting of a decorative strip covering the gap with a web projecting obliquely from the latter which can be inserted into the gap, on which barb-like ribs pointing outwards are provided.

BACKGROUND OF THE INVENTION

A trim strip of this type is represented and described on EP No. 0,111,106 as the state of the art.

Gaps between the window glass and the window frame are often of quite different widths due to bodywork tolerances. When gap widths are small, the rib on the window glass side may remain wedged in the gap and therefore cannot spread out to engage behind the window glass and hook onto the trim strip.

To remedy this state of affairs, DE-OS No. 31 17 724 teaches that an arresting device with snap lugs is inserted in the gap. The ribs of the trim strip can then engage under the snap lugs so that they are securely hooked on. Because of the additional arresting device, however, such an arrangement is relatively expensive and requires additional working steps during assembly.

The basic problem on which the invention is based is that of configuring a trim strip of the type mentioned initially is as simple a manner as possible so that it can be securely hooked on even with gaps of greatly differing widths.

SUMMARY OF THE INVENTION

According to the invention, this problem is solved by the fact that the lowest rib facing the window glass in the installed state has two catch surfaces provided at different heights to engage behind the window glass.

This configuration ensures that hooking occurs even in very narrow gaps, in which the lower rib on the window glass side is jammed in the gap and therefore cannot pivot outward, since the lower catch surface is then available for engagement. In wider gaps, hooking is achieved by the upper catch surface, so that large gap widths can also be bridged. The trim strip according to the invention therefore makes only modest demands in terms of manufacturing precision. It is particularly suitable for repair purposes, making it possible to anchor the trim strip in the adhesive layer.

The structure of the trim strip according to the invention is very simple, since according to one advantageous development of the invention, the lowest rib on the window glass side is split, and the catch surfaces are each provided on one arm of the lowest rib.

The trim strip can be inserted even into gaps of very different widths if the upper arm of the lower split rib is longer than the lower arm and has an enlargement at the end.

The above-mentioned advantages can also be obtained if, according to another development of the invention, the lower rib is not split, but rather the first catch surface is provided on the upper side and the second catch surface is provided on a hump on the underside of the same rib.

Retention of the trim strip in the gap is especially good if, when the lowest rib on the window glass side is in the relaxed state, the second catch surface runs approximately perpendicular to decorative strip.

BRIEF DESCRIPTION OF DRAWINGS

The invention admits of numerous embodiments. Two of them are illustrated in the drawings and will be described below. The drawings show.

DESCRIPTION OF THE PREFERRED EMBODIMENT

Figure 1:
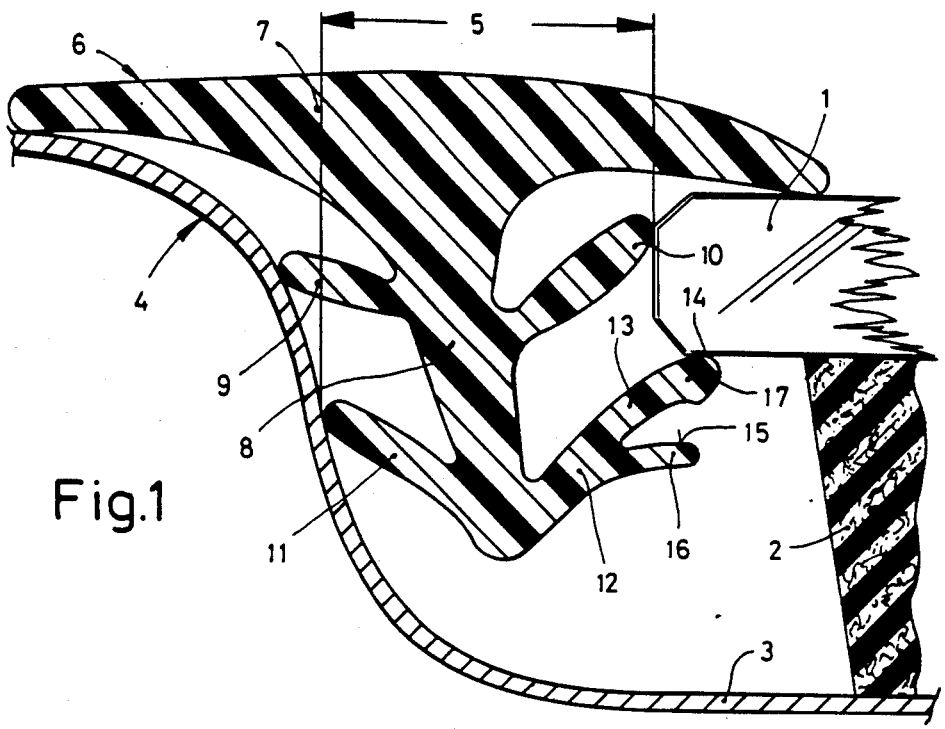
in FIG. 1, a cross section through a trim strip according to the invention, as installed in a wide gap, with the adjacent components.

FIG. 1 partially illustrates a window glass 1 of a passenger car, which is secured by means of an adhesive layer 2 onto a pane flange 3. The pane flange 3 is part of a window frame 4. Between this window frame 4 and the window glass 1 is a relatively wide gap 5, into which a trim strip 6 is inserted.

This trim strip 6 has a decorative strip 7 contacting both the window glass 1 and also the window frame 4, with a web 8 leading into the gap 5, which has ribs 9, 10, 11, 12 pointing outward at different heights. The ribs 9 and 11 contact the window frame 4, and the rib 10 contacts the side surface of the window glass 1. An important element of the invention is the rib 12, the end of which is split. A longer arm 13 engages, by means of a catch surface 14 on an enlargement 17 beneath the window glass 1 and thereby holds the trim strip 6 in the gap 5. A shorter arm 16, which also has a catch surface 15, projects freely, in the case of the wide gap 5 illustrated, beneath the arm 13 into the space between the window glass 1 and the pane flange 3.

Figure 2:
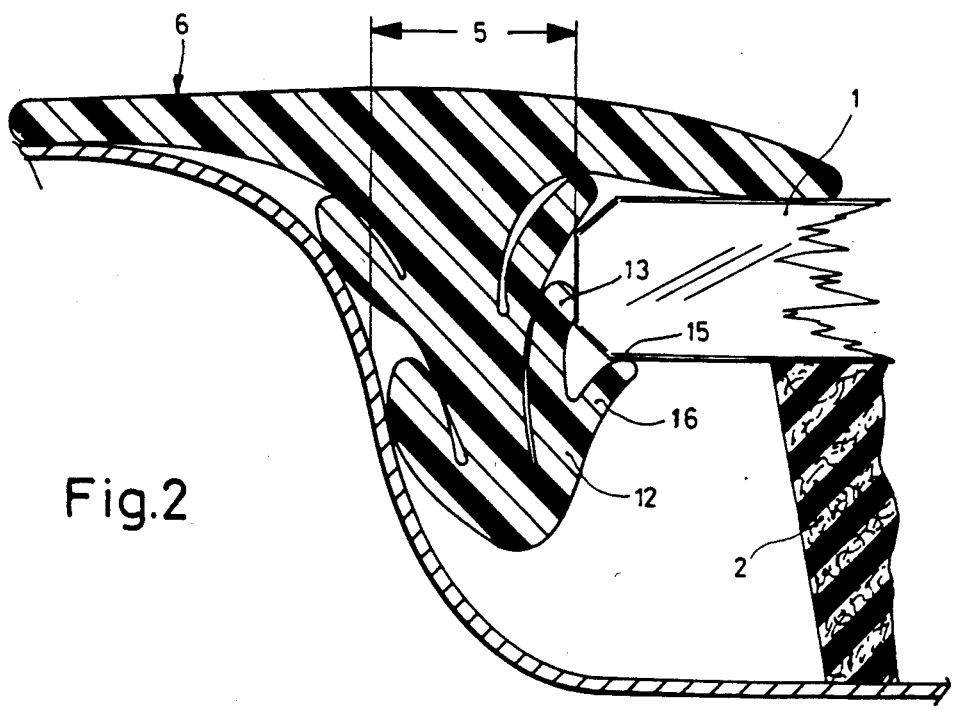
in FIG. 2, the arrangement in FIG. 1, with a narrow gap.

In the installation example of the trim strip 6 shown in FIG. 2, the gap 5 is considerably narrower than in FIG. 1. The arm 13 therefore cannot reach the gap 5, so that it cannot engage behind the window glass 1. Instead, because of the deformation of the rib 12, the catch surface 15 on the arm 16 now engages from below against the window glass 1 and thereby holds the trim strip 6 in the gap 5.

Figure 3:
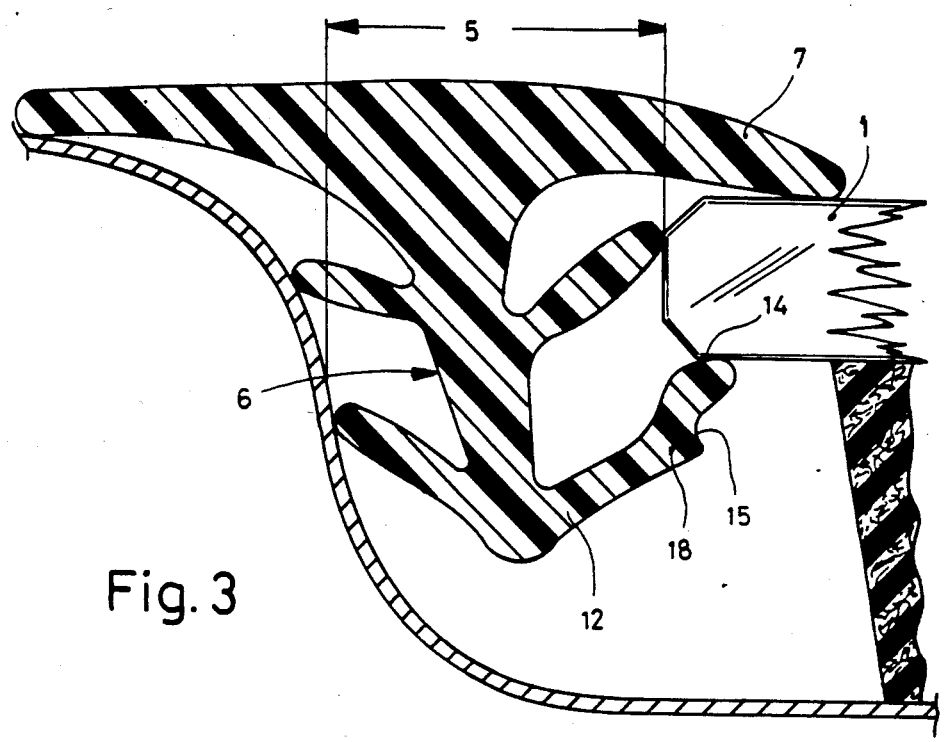
in FIG. 3, cross section through a second embodiment of a trim strip according to the invention, as installed in a wide gap.

The trim strip 6 shown in FIG. 3 differs from the one previously described in that the rib 12 is differently configured. It again has, on its side facing the decorative strip, a catch surface 14, but it also has on its underside a hump 18 which bears the second catch surface 15. In the case of the wide gap 5 shown in FIG. 3, this catch surface 15 runs approximately perpendicular to the window glass 1.

Figure 4:
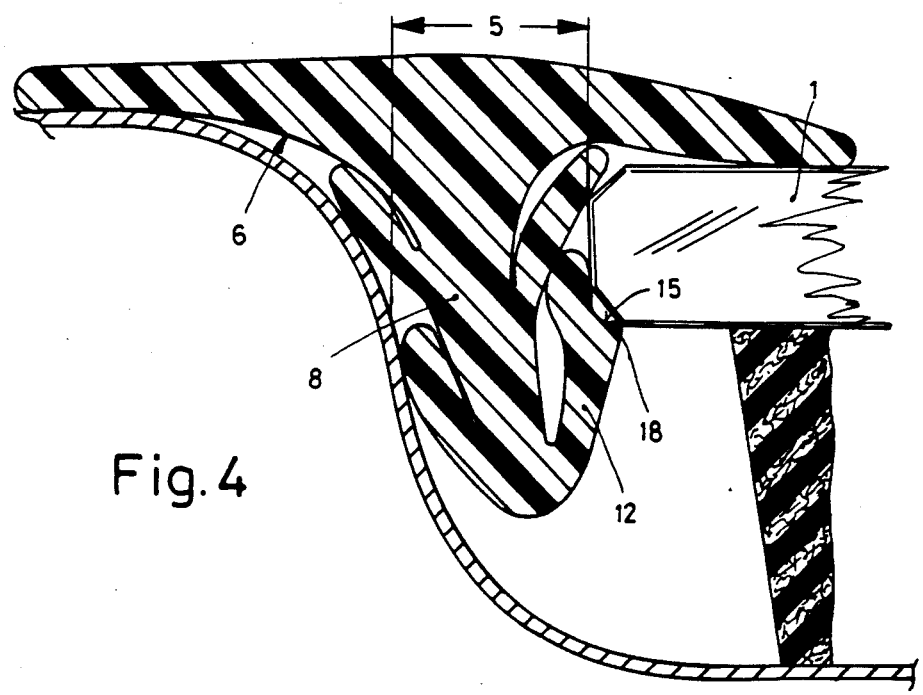
in FIG. 4, the arrangement in FIG. 3, with a narrow gap.

If the trim strip 6 is inserted into a narrow gap 5, as shown in FIG. 4, the end region of the rib 12 remains in the gap 5. Because of the rib 12 contacting the web 8, however, the catch surface 15 formed by the hump 18 runs approximately horizontally and can come into contact with the back side of the window glass 1.

The embodiments of the invention in which an exclusive property or privilege is claimed are defined as follows:

1. A trim strip for covering a gap between a window glass and a window frame, consisting of a decorative strip covering the gap with a web projecting obliquely from the decorative strip for insertion into the gap, and a plurality of barb-like ribs pointing outwards from the web to engage the window glass and the window frame, characterized by the lowest most of the ribs facing the window glass being split to provide an upper arm and a lower arm at different heights and each arm having a having catch surface to engage with the glass and the upper arm being longer than the lower arm and having an enlargement at the end.

2. The trim strip of claim 1 further characterized by the lowermost rib facing the window glass having a relaxed state in which the lower arm extends approximately perpendicular to the decorative strip.

* * * * *